United States Patent [19]

Wu

[11] Patent Number: 5,258,205
[45] Date of Patent: Nov. 2, 1993

[54] RAPID-SETTING OF PLASTICALLY DEFORMABLE STRUCTURES

[75] Inventor: Shy-Hsien Wu, Horseheads, N.Y.

[73] Assignee: Corning Incorporated, Corning, N.Y.

[21] Appl. No.: 926,460

[22] Filed: Aug. 7, 1992

[51] Int. Cl.$^5$ ............................................. B05D 3/02
[52] U.S. Cl. ............................. 427/393.6; 427/385.5
[58] Field of Search ......................... 427/393.6, 385.5

[56] References Cited

U.S. PATENT DOCUMENTS

| | | | |
|---|---|---|---|
| 4,338,353 | 7/1982 | Melchior | 427/36 |
| 4,358,486 | 11/1982 | Ecord et al. | 427/379 |
| 4,552,786 | 11/1985 | Berneburg et al. | 427/249 |
| 4,725,391 | 2/1988 | Bardhan et al. | 264/82 |

Primary Examiner—Anthony McFarlane
Assistant Examiner—Nhat D. Phan
Attorney, Agent, or Firm—Angela N. Nwaneri

[57] ABSTRACT

The invention relates to a method for rapidly setting or stiffening a soft, freshly formed body such as fragile and complex thin-walled cellular substrate to prevent damage and distortions and to preserve the integrity of the substrate during the pre-firing stages of the manufacturing process. A method is disclosed for rapidly setting such objects by impregnating the object with a rapid-setting compound for a time and at a temperature sufficient to irreversibly stiffen the object, and thereafter removing any excess compound from the object. Useful rapid-setting compounds having a high affinity for water, and having appropriate molecular blocking configuration are disclosed.

26 Claims, No Drawings

RAPID-SETTING OF PLASTICALLY DEFORMABLE STRUCTURES

BACKGROUND OF THE INVENTION

The present invention relates to a method of rapid-setting a formed body to improve the surface integrity and handling of such body during the pre-firing process.

It is becoming increasingly common to process or form highly loaded plastically deformable mixtures into complex structures such as a honeycomb configuration formed by extrusion. Immediately upon forming, the resulting structure is generally soft and fragile, and easily damaged or distorted, making the handling and processing of such structures very difficult.

There is need for a more effective rapid-setting process during the pre-firing stage to reduce the amount of waste and increase the productivity of such operations. In the conventional method, cellular monoliths for example, are heated in air with various forms of energy such as thermal, dielectric, IR or induction. The conventional mechanism involves the diffusion and vaporization of batch water at or above 100° C. to achieve solidification or stiffening through de-water and binder gelation. Large amounts of energy (heat) is required to vaporize water at this temperature particularly through air, a poor heat transfer medium. As a result, relatively long periods of time are required to achieve solidification of such monoliths during the manufacturing process.

Various methods have been proposed for reducing the solidification time including the application of intense heat from an infra-red, induction or dielectric source, or the use of certain chemical reactions such as an alginate/Ca ion system. The former is inefficient and is a relatively slow process due to the use of a lot of energy for the heating of sometimes, very poor heat conductors such as Celcor ®. The latter process presents a difficult problem as it attempts to remove the residual Ca, often by a post wash operation which results in a resoftening of the product. Also, the residual Ca will tend to alter the batch composition.

There is nothing in the background art suggesting the use of relatively clean and energy efficient liquid compounds for the rapid-setting of formed structures. In particular, there has been no teaching or suggestion to use such liquids to rapidly stiffen cellular structures formed from thermally gelable organic binders such as Methocel ®, a methyl cellulose containing binder.

SUMMARY OF THE INVENTION

It is the object of the present invention to provide a method of rapidly setting or stiffening a porous body formed of a high solids matrix containing thermally gelable organic binder, the method comprising the steps of contacting the body with a rapid-setting compound for a duration and at a temperature sufficient to stiffen the body, and removing any excess compound from the body, the rapid-setting compound being characterized by (a) having a strong water affinity to pull water out of the matrix, and (b) having appropriate molecular blocking configuration and/or larger steric hindrance to prevent the water from re-entering the matrix.

Although the method is effective at room temperature, I have found that the rapid-setting efficiency is enhanced by maintaining the rapid-setting compound at elevated temperatures. At elevated temperatures, the liquid viscosity is reduced making it easier to remove the excess rapid-setting compound from the body after the contacting step. In addition, elevated temperatures promote water diffusion out of the matrix and improves the thermal gelation of the binder.

After the dipping operation, any excess liquid may be removed by drip drying, wiping, or by blowing cold or hot air on the body. Optionally, any excess liquid may be removed by placing the dipped structure in an oven at a time and temperature sufficient to remove the excess liquid without firing or sintering the structure.

In another aspect of the invention, a method is provided by which the formed body is immersed in a liquid compound immediately as the body emerges from the forming apparatus.

DETAILED DESCRIPTION OF THE INVENTION

According to an important aspect of the present invention, a rapid-setting mechanism for high solid matrix systems containing thermally gelable binders has been identified. In one aspect, cellular ceramic and metal monoliths have been rapidly solidified or stiffened by dipping the monoliths in liquid solutions of appropriate rapid-setting compounds. The key feature of the rapid-setting mechanism is the ability to pull out a significant amount of water rapidly from a high solid matrix and, at the same time, ensure that no water or other small molecules re-enter or diffuse into the matrix to plasticize the binder.

Two essential characteristics of useful rapid-setting compounds for the practice of the present invention include (1) high water affinity to effectively pull out water from the matrix, and (2) appropriate molecular blocking configuration to ensure no re-entry or diffusion of water back into the matrix. Preferably, the rapid-setting compound is in waxy form at room temperature (RT) so as to impart RT-stiffening effect. It is also desirable that the given compound be stable at elevated temperatures, preferably, at about 100° C. to promote water diffusion and lower liquid viscosity. Also, preferably, the rapid-setting compound is chemically inert to a Methocel ® batch so as not to plasticize the binder or react with the batch ingredients. Other desirable characteristics of the rapid-setting compound are that it be (i) physically inert and stable (i.e., non-flammable, non-toxic, no strong odor, and no pick-up of excessive moisture on standing), (ii) clean in burn-off so as not to contaminate the batch, (iii) be reusable and/or be relatively low cost, and (iv) the excess compound be easily removed after dipping.

To achieve irreversible rapid-setting, a formed porous body comprising a high solids matrix and containing thermally gelable organic binder, is contacted with a rapid-setting liquid at a temperature and for a period of time sufficient to stiffen the formed body. After the body has been sufficiently stiffened, any excess rapid-setting liquid may be removed from the body by various known methods including wiping, blow drying particularly with hot air, and oven drying at temperatures above 100° C. At temperatures below 100° C. the air tends to be damp and the moisture will re-soften the sample.

Two broad categories of effective organic compounds have been identified to be particularly useful rapid-setting compounds. These include liquid and waxy forms of compounds such as surfactants and binders respectively. In addition, certain water-soluble polymers such as polyethyleneimine have been identified as effective rapid-setting compounds.

1. Liquid Surfactants

Surfactants having high water affinity and unique molecular configuration with bulky tail ends such as Triton ® compounds with varying ethylene oxide (EO) units, for example, Triton ® X-100, an octylphenol ethoxylate, with 10 EO units, Triton ® X-405 with 40 EO units, and waxy Triton ® X-705 with 70 EO units, are particularly useful for the practice of the present invention. The bulky hydrophobic end group of these liquid surfactants make it difficult for the molecules to diffuse and carry water back into a Methocel ® matrix to re-plasticize the binder. Triton ® X-405 and Triton ® X-705 have higher water affinity than Triton ® X-100, and should therefore be more efficient at pulling water out of the matrix than the latter. However, I have found that both Triton ® X-405 and Triton ® X-705 are not as effective as Triton ® X-100 because they are only available at concentrations of 70% solution (i.e., with 30% water).

In addition to surfactants, certain salt solutions having high affinity for water, such as calcium chloride solution, have been found to be effective rapid-setting compounds. At room temperature, only a 35% calcium chloride solution can be prepared. At this dilution, only a minor rapid-setting effect was observed after contacting a monolith with the solution for about 10 seconds. As the salt solution was increased to about 50% at 70° C., a marked increase in rapid-setting efficiency was observed. In addition to a 50% $CaCl_2$ solution, a combination of Ca ion/alginate is equally effective as a rapid-setting compound. However, both compounds suffer from one major drawback of salt solutions in general namely, the difficulty of removing the inorganic salt from the matrix after dipping. The residual calcium, if not adequately removed, will tend to alter the batch composition or matrix and as a result, compromise or adversely affect the quality of the final formed bodies.

The effectiveness of solvents as rapid-setting compounds is adversely affected by their relatively small molecular sizes which permits water to re-enter or diffuse back into the matrix and re-plasticize the binder. The higher the water affinity of a solvent, the better it is able to pull water out of a high solid matrix, and provide a temporary stiffening effect. For example, acetic acid and acetone, which have strong water affinities, should be very effective in pulling water out of a high solid matrix. However, I have found that the resulting stiffening is poor due to the two-way water diffusion mechanism described above. Water molecules are not strongly associated with these solvents in the liquid phase and are therefore, relatively free to diffuse back into the matrix. As a result, no permanent or irreversible solidifying or stiffening effect is achieved with these solvents.

The water affinity of surfactants is measured by their Hydrophile-Lipophile Balance (HLB) value, obtained by dividing the weight percent of ethylene oxide in the surfactant by 5. The scale of HLB values range from 0, being completely lipophilic or hydrophobic, to 20, being completely hydrophilic or lipophobic. For the present invention, HLB values of at least 13 are preferred. The HLB values of Triton ® X-100, X-405 and X-705 are 13.5, 17.9 and 18.7 respectively.

Other liquid surfactants useful for the practice of the present invention include the following group of compounds which bear the same essential molecular configuration as Triton ® X-100 with bulky tail groups: ethoxylates of secondary alcohol, for example, Tergitol ® 15S-20 with 20 EO units and having a bulky tail provided by two branching alkyl chains, each with 11 to 15 carbon atoms, ethoxylated sorbitan monolaurates such as Embsorb ® 6915 with 20 EO units, ethoxylated tallow amine such as Trymeen ® 6637 with 40 EO units, ethoxylated castor oil such as Trylox ® 5918 with 200 EO units, and dinonylphenyl ethoxylates such as Trycol ® 6989 with 150 EO units. The latter two compounds are only available in 50% solution and are therefore not very effective as rapid-setting compounds.

Certain liquid surfactants having high water affinity but lacking bulky tail groups such as Surfynol ® 485 (an acetylenic ethoxylate with 30 EO units, available from Air Products), were found to be ineffective as rapid-setting liquids. The molecules of this compound are symmetrical with respect to the center acetylenic group with a 4 carbon chain, plus 15 EO units connecting to each side of the acetylenic group, with no clear bulky tail group. As a result, water which is pulled out is later diffused back into the matrix with surfactant molecules to replasticize the binder.

2. Binders

Waxy binders such as Carbowax ® 4600, with a strong water-affinity and a long straight chain molecule having 104 EO units and no bulky end group, are particularly useful as rapid-setting compounds. Unlike Triton ® which is a much shorter macromolecule having only 10 EO units, but having a bulky end group, Carbowax ® 4600 relies solely on its very long chain to prevent diffusion through its strong steric hindrance. The large steric hindrance will not permit the long chain molecules of this compound to diffuse deeply into the interior of a Methocel ®-containing matrix. At the same time, as a result of its strong water affinity, some molecules can anchor on cells with one end of the molecule partially penetrating the surfaces and with the other end being able to associate with other waxy molecules to form a thin waxy film, thus adhering tightly over the entire cell surface to exert room temperature reinforcing effect. Thus, the waxy feature of Carbowax ® 4600 imparts room temperature reinforcing or stiffening effect on samples dipped in this compound. In this respect, Carbowax ® is a better rapid-setting compound than the liquid surfactants discussed above.

To verify the existence of steric hindrance on the rapid-setting efficiency of Carbowax ® molecules, the relatively short molecules of Carbowax ® 400 (a liquid having 9 EO units) was compared to the long chain molecules of Carbowax ® 4600 (a waxy compound having 104 EO units). At 90° C., only a minor stiffening effect was observed using the shorter chain Carbowax ® 400. On the other hand, after a 10 sec. dip in Carbowax ® 4600 at 90° C., the substrate was very stiff, similar to the results obtained using Triton ® X-100. The poor performance of Carbowax ® 400 is believed to be due to the diffusion of the shorter chain molecules back into the matrix, i.e., the lack of strong steric hindrance.

Other waxy binders such as Carbowax ® 1000 and 8000 having 22 EO units and 181 EO units respectively, can also be used as rapid-setting compounds. Carbowax ® 1000 was found to impart a degree of rapid-setting and room temperature reinforcing or stiffening effect on the substrate, but such effects were to some extent less than were observed with Carbowax ® 4600. It was clear that at EO units of 22, some significant steric hindrance effects can be observed. When samples were dipped into Carbowax ® 8000 compound (melting point 63° C. compared to 60° C. for Carbowax ® 4600) at 90° C., the viscosity of the molten wax was very high making the dipping process slow and less effective and also making the subsequent removal of the wax from the body difficult. Consequently, this longer chain compound yielded a poorer rapid-setting result than the smaller chain molecules of similar configuration. Without intending to be bound by theory, it is believed that the high viscosity of Carbowax ® 8000 must have impeded the water diffusion out of the matrix and into the molten wax and caused the water to accumulate under the skin region, resulting in poorer efficiency and poor (blistered) skin quality. When the viscosity of the Carbowax ® 8000 was reduced by using a 70% concentration, the rapid-setting efficiency was improved but with a countervailing loss in room temperature reinforcing effect.

Experiments to determine the effect of molecular weight on the effectiveness of high water affinity, waxy binders such as Carbowax ® compounds indicate that an optimum level of molecular weight to be in the order of about 100 EO units. At this level, the compound will have enough chain length for a strong water affinity to pull water out of the matrix, and a sufficient steric hindrance to avoid water re-entering, resulting in a high rapid-setting efficiency. When the chains are too long the compound becomes highly viscous which adversely affects the rapid-setting efficiency as well as the dipping process.

As described in Example A(2), certain hydrophilic binders such as Carbowax ® 4600 have been found to provide excellent room temperature stiffening effect. This is in sharp contrast to hydrophobic waxy compounds such as octadecanol which showed a false rigidifying effect due to a complete filling of the cells with wax. However, the sample was easily cut using a razor with a small to medium amount of force. The thick waxy film formed on the sample peeled off easily on standing, suggesting that the film was not properly or sufficiently adhered on the substrate.

3. Waxy Surfactants

Solid or waxy surfactants having high water affinity, for example, straight chain compounds such as Trycol ® 5964 (an ethoxylated lauryl alcohol with 23 EO units, available from Emery), Pluronic ® F38 (a block copolymer of poly(ethylene oxide) centered with poly(propylene oxide, PO), molecular weight 5000, with about 100 EO or PO units) and R 10R8 (having the reverse structure of Pluronic ® F38 but, with 100 PO or EO units), (both available from BASF), and bulky tail compounds such as Trycol ® 6971 (a nonylphenyl ethoxylate with 50 EO units, available from Emery), Igepal ® CO 990 (similar to Trycol ® 6971, but with 100 EO units, available from GAF), Igepal ® DM 970 (generically known as ethoxylated dialkylphenol, having two branching alkyl chains attached to the phenol group, available from GAF), Emulphor ® EL 980 (an ethoxylated castor oil with 200 EO units, also available from GAF), and Tetronic ® 707 (a tetrafunctional compound with four symmetric branching block copolymers of EO or PO, about 60 units long, available from BASF) have been shown to be useful for the practice of the present invention. Pluronic ® F38 is very similar in structure to Carbowax ® 4600 and has been found to perform about as effectively as the latter as a rapid-setting compound.

Experiments with straight chain and bulky tail compounds suggest that the minimum chain length for generating a sufficient steric hindrance (to avoid water reentering the matrix) in a straight chain is dependent on the nature of such chain. Without intending to be bound by theory, it is believed that for a completely hydrophilic chain like the Carbowax ® compounds, the minimum chain length may be in the order of about 100 EO units. However, for a hydrophobic lauryl group, a chain length as short as about 20 EO units may be sufficient to exert a strong steric hindrance in an highly loaded aqueous Methocel ® matrix as demonstrated by the excellent rapid-setting efficiency of Trycol ® 5964, an ethoxylated lauryl alcohol having a short 12 carbon alkyl chain plus 23 EO units. This observation was also verified by the fact that Trycol ® 6971 (a bulky tail compound with 50 EO units) produces a rapid-setting effect very similar to Carbowax ® 4600 (about 100 EO units), suggesting that a bulky tail compound with a short chain length can be as effective as a long chain compound without a bulky tail. The effect of bulky tail groups was also shown in experiments comparing Trycol ® 6971 with Igepal ® CO 990 (also a bulky tail compound having a much longer tail of 100 EO units). The much longer chain of the latter leads to a very high viscosity which results in a slower stiffening efficiency and poorer drainage than those of Trycol ® 6971. However, Igepal ® still imparts a very significant room temperature stiffening effect on highly loaded substrates, indicating that a hydrophobic, bulky tail compound does not need a high number of EO units to have the proper balance of water affinity, viscosity and room temperature stiffening.

Compounds with branched end groups tend to be highly viscous resulting in slow stiffening effect and poor drainage of excess stiffening compound. For example, Igepal ® DM 970, an ethoxylated dialkylphenol having two branching alkyl chains attached to the phenol group, and Tetronic ® 707, having four symmetric branching block copolymers of EO and PO, the two most viscous compounds studied produced the least desirable rapid-setting efficiency due to poor water diffusion and difficulty in removing excess surfactant, even at high temperatures. However, these compounds produced very good room temperature stiffening effect.

While most of the high water affinity, waxy compounds studied showed very strong room temperature reinforcing features, certain solid compounds having good water affinity did not impart the same effect. For example, Tergitol ® 15S-20, a solid surfactant with a melting point of 34° C. did not produce any room temperature stiffening. However, like Triton ® X-100, a liquid surfactant, it yielded very good rapid-setting efficiency. Also, Carbowax ® 1000, a waxy compound imparts only minor room temperature stiffening effect. Without intending to be bound by theory, it is believed that the key to a good RT-reinforcing effect lies in the relative strength of the solid compound. Thus, Pluronic ® F38 and Carbowax ® 4600, two strong hydrophilic compounds (a surfactant and binder respectively), both yield very good rapid-setting as well as good room temperature stiffening effects.

4. Water-Soluble Polymers

Besides polyethylene glycol and block copolymers of EO and PO, other water-soluble polymers such as polyethyleneimine (PEI) have been found to be useful rapid-setting compounds. For example, Epomine ® SP-012 (a viscous PEI liquid with a molecular weight of 1200 or 27.9 ethylene imine (EI) units, available from Aceto Chemical), produces a rapid-setting efficiency very similar to that of Carbowax ® 1000 having 22 EO units.

Certain water-soluble polymers such as polyvinyl alcohol (PVA) and polyethylene oxide (PEO) are not desirable as rapid-setting compounds because these polymers are not commercially available in sufficiently low viscosities at relatively high concentrations to be useful for the practice of the present invention. For example, the lowest molecular weight of commercially available PVA is 3000 (#15133 available from Polyscience, Inc.) which yields a very viscous solution at only 50% concentration, and the least molecular weight PEO is 100,000 (Polyox ® WSR N-10, available from Union Carbide) with very limited water solubility.

TEST PARAMETERS

Substrates

In the following examples, cellular samples (400/6, 1 in. diameter, and 2 or 3 in. length) of Celcor ® or metal monoliths were used to evaluate the rapid-setting properties of various compounds.

(1) Sample 1 was prepared using a standard automotive ceramic batch containing Methocel ® A4M. The batch was then made softer and stickier by mixing for a longer period of time than is required for the standard batch (20 minutes instead of 2 minutes, in a Brabender Mixer).

(2) Sample 2 was prepared using a ceramic batch similar to Sample 1 except that Sample 2 contained Methocel ® F40M instead of A4M.

(3) Sample 3 was prepared using a metal batch used for preheaters. As with Sample 1, the batch was mixed for a prolonged period of time (20 minutes) using a Brabender Mixer to make the formed sample soft and sticky.

Dipping Test

Initially, about 2 inches of a 3-inch sample was dipped in the rapid-setting liquid with the remaining 1 inch used as control for each test. The stiffness of the dipped portion was compared with that of the control portion. The dipping times ranged from 5 seconds to 10 minutes, but generally about 10 seconds. The rapid-setting compounds were tested at temperatures ranging from room temperature (define) to 120° C., but generally at about 90° C. After dipping the samples in the rapid-setting liquid, the samples were drip dried by placing them upright on paper towel and/or wiped to remove the excess liquid. In some cases, the samples were blown with either cold or hot air to remove the excess liquid.

In latter experiments, full 2-inch samples were completely immersed in rapid-setting liquid, followed by a standard drying step which was developed to remove excess liquid from the samples involving placing the samples in a 150° C. oven for about 5 minutes.

Stiffness Test

About 3 minutes after the samples were removed from the rapid-setting liquid, the samples were tested for rigidity by squeezing intermittently between two fingers in two main directions: (1) along the 0°/90° cell direction, i.e., horizontal (0° direction in the cell cross section/vertical (90°) cell lines, and (2) along the 45° cell direction, i.e., along the diagonal cell line (45°). For very stiff samples, rigidity was tested by cutting the samples with a razor and observing the degree of stiffness. When the standard drying test was used to remove excess liquid from the samples, the rigidity of such samples was tested both before and after such drying.

EXAMPLES

A. Rapid-Setting Compounds (1) Surfactants (Triton ® X-100). In this experiment, Samples 1, 2, and 3, were dipped in Triton ® X-100, a liquid surfactant, for a period of 10 seconds, at 90° C. and at room temperature. Samples 1 and 2 were further dipped in the surfactant for 10 seconds at temperatures varying from 120° C. through 110, 90, 70, 60, 50, 40 and room temperature, to study the effect of temperature on rapid-setting efficiency. No difference in rapid-setting efficiency was observed between 90° and 120° C. in Samples 1 and 2. Similarly, the rapid-setting efficiency also remained about the same as the temperature was varied from 40° to 60° C. (the gel point of Methocel A4M and F40M are 48° and 54° C. respectively). However, as the temperature decreased below 90° C., the viscosity of the solution increased significantly thus retarding the dipping or wetting rate and making the subsequent removal of excess surfactant difficult. The duration of the dipping step was varied from 5 seconds to 10 minutes. Samples dipped for 5 seconds did not completely stiffen. After dipping the samples for about 10 seconds, the samples were completely stiffened and further dipping for a period of up to 10 minutes did not produce any noticeable improvement in the stiffening efficiency of samples dipped for 10 seconds.

The concentration of Triton ® X-100 in the dipping solution was varied from 50% solution in water to 100% Triton ® X-100. At a concentration of 70%, there was no significant loss in rapid-setting efficiency at 90° C. for a 10 second dip. At 50% concentration there was a loss in rapid-stiffening efficiency due to the large amount of water present. The addition of water reduces the viscosity and thus improves the rapid-setting efficiency of Triton ® X-100. Therefore, starting with a high concentration (100%) of Triton ® X-100, the dipping solution may be reused several times until the water content approaches 40%.

At 90° C., there was no significant difference between the rapid-setting efficiency observed between the ceramic and metal monoliths. However, at room temperature, metal samples with 6% Methocel ® A4M did not solidify as rapidly as the ceramic substrates probably due to the presence of more binder which hold water more tightly inside the metal batch.

(2) Solid or Waxy Binders (Carbowax ® 4600). In this experiment, the same ceramic and metal cellular samples used in A(1) above (i.e., Sample 2 and 3) were dipped in a molten Carbowax ® bath at 90° C. The hydrophilic wax quickly wetted the sample surfaces and after about 10 seconds in the bath, the samples were removed from the bath and placed in an upright position to cool. Within 10 to 25 minutes, the samples exhibited significant room temperature reinforcing (stiffening) effect and the samples could only be cut using a razor blade with a large force applied.

The newly cut cross sections of the samples revealed almost completely clean cells and remained in perfect circular patterns, confirming the strong anchoring and stiffening effects of a thin, hydrophilic wax film over the entire cell skins. The dipped samples were also observed to dry well in a dielectric oven without blistering. Finally, the excess surface wax was removed efficiently at 150° C. without difficulty.

To check the effect of temperature on the rapid-setting efficiency of this compound, a set of samples were dipped in a molten Carbowax ® bath at 120° C. No significant differences in rapid-setting efficiency were observed between these samples and the samples dipped at 90° C.

In another set of experiments, the concentration of the Carbowax ® bath was varied from 100% to 90, 80, 70, and 50% with water. The rapid-setting efficiency was found to be good with a 70% solution but not with the 50% solution. It was further observed that the room temperature reinforcing or stiffening effect is preserved only in the concentration range of 90 to 100%. Below 90% concentration, the room temperature reinforcing effect is substantially lost. The same results were obtained when Carbowax ® was diluted in isopropanol instead of water.

B. Comparative Examples (1) Control Sample. For comparison, a control sample of a well-mixed batch of highly loaded matrix containing thermally gelable organic binder (Methocel ® A4M) was formed into a porous cellular body. The body was soft, slightly sticky and flexible upon forming. After drying the sample at 150° C. for 5 minutes (without dipping in a rapid-setting solution), the sample became dry and fragile. The sample was somewhat rigid along the 90° cell line, but still flexible and very weak along the 45° cell line. Also, the control sample developed fissures after the drying step.

(2) Rapid-Set Sample. In this comparative example, using one of the preferred embodiments of the invention, a 2 in. diameter sample was prepared using the same highly loaded batch of the control sample. The sample was dipped in a rapid-setting solution (Triton ® X-100) for 10 seconds at 90° C. The sample was then stood upright on an absorbent sheet of material for about 3 minutes to drain some of the excess rapid-setting liquid (without wiping the sample skin). After the dripping step, the sample was placed in a 150° C. oven for a period of 5 minutes, after which the sample was removed and allowed to come to room temperature. The advantage of the post-drying step is to produce a dry sample which is also clean in appearance. The above steps were repeated using Carbowax ® 4600 in place of Triton ® X-100.

After cooling down, the samples were observed to be very stiff and displayed the same rigidity in both the 90° and 45° cell lines. The sample skin and cross-sections were crack-free and substantially free of the rapid-setting compound.

In addition to the embodiments discussed above, it will be clear to persons skilled in the art that numerous modifications and changes can be made to the above invention without departing from its intended spirit and scope. Thus, even though the above description of the rapid-setting mechanism of the present invention has been limited to cellular structures such as Celcor ® and metal monolith systems, it will be clear to persons skilled in the art that the methods described above can be applied in other cases where the control of skin water content is desirable. For example, the formation of fissures and cracks in certain structures may be related to the non-uniform drying of water in the surface area so that the above methods may be applicable in such situations. By dipping such structures first in a rapid-setting liquid to remove the majority of the skin water, a more uniform distribution of a much smaller amount of water will result in the entire surface region, thus enhancing the subsequent drying process and avoiding the formation of fissures and cracks. It is also within the contemplation of the present invention to apply ultrasonic energy to the rapid-setting solution during the dipping step to improve the wetting of the body by removing tiny bubbles which tend to form on the surface of the body, thus enhancing the rapid-setting mechanism.

I claim:

1. A method of stiffening a porous body formed of a matrix containing thermally gellable organic binder, said method comprising the step of contacting the body with a rapid-setting compound for a duration and at a temperature sufficient to stiffen the body, the rapid-setting compound being characterized by (a) having a strong water affinity to pull water out of the matrix, and (b) having appropriate molecular blocking configuration and/or large stearic hindrance to prevent the water from re-entering the matrix.

2. The method of claim 1, wherein the duration of the contact between the structure and the rapid-setting compound is in the range of 5 seconds to 10 minutes.

3. The method of claim 1, wherein the temperature of the rapid-setting compound is in the range of 40° to 120° C.

4. The method of claim 1, wherein the contacting step is accomplished by dipping the structure in a solution of the rapid-setting compound.

5. The method of claim 4, wherein the temperature of the rapid-setting solution is about 90° C.

6. The method of claim 5, wherein the structure is dipped in the rapid-setting solution for a duration of 10 seconds.

7. The method of claim 1 further comprising the step of removing any excess compound from the body.

8. The method of claim 1, wherein the temperature of the rapid-setting compound is in the range between room temperature and 120° C.

9. The method of claim 1, wherein the rapid-setting compound is further characterized by a molecular weight is in the range of 20 to 180 ethylene oxide units.

10. The method of claim 1, wherein the rapid-setting compound is further characterized by having hydrophile-lipophile balance value greater than 13.

11. The method of claim 1, wherein the rapid-setting compound is selected from the group consisting of surfactants, binders, and water-soluble polymers.

12. The method of claim 11, wherein the rapid-setting compound is selected from the group consisting of glycol ether solvents, alkylphenyl polyether alcohols such as octylphenyl ethoxylate, ethoxylates of secondary alcohols, ethoxylated sorbitan monolaurate, ethoxylated tallow amine, dinonylphenyl ethoxylates, solid and/or waxy surfactants such as ethoxylated lauryl alcohol, block copolymers of poly(ethylene oxide) centered with poly(propylene oxide), block copolymers of poly(ethylene oxide) centered with poly(ethylene oxide), nonylphenyl ethoxylates, ethoxylated castor oil, and ethoxylated dialkylphenol.

13. The method of claim 12, wherein the rapid-setting compound is selected from the group consisting of octylphenol ethoxylates having ethylene oxide units of 10, 40 and 70 respectively; an ethoxylated lauryl alcohol with 23 ethylene oxide units; a nonphenyl ethoxylate with 50 ethylene oxide units; a block copolymer of poly(ethylene oxide) centered with poly(propylene oxide); a nonphenyl ethoxylate with 100 ethylene oxide units; an ethoxylated castor oil with 200 ethylene oxide units; ethoxylated dialkylphenol having two branching alkyl chains attached to the phenol group; a polyethyleneimine having 27.9 ethylene imine units; waxy binders having 22, 104 and 181 ethylene oxide units respectively; ethoxylated sorbitan monolaurate having 20 ethylene oxide units; ethoxylated tallow amine having 40 ethylene oxide units; and ethoxylate of secondary alcohol having 20 ethylene oxide units.

14. The method of claim 1, wherein the rapid-setting compound is selected from octylphenol ethoxylate having 10 ethylene oxide units, ethoxylate of secondary alcohol having 20 ethylene oxide units, and a waxy binder having 104 ethylene oxide units.

15. The method of claim 1, wherein the rapid-setting compound is further characterized by being capable of imparting room temperature stiffening effect on the porous body.

16. The method of claim 15, wherein the rapid-setting compound is a waxy hydrophilic compound selected from the group consisting of a waxy binder having 104 ethylene oxide units and a block copolymer of poly(ethylene oxide) centered with poly(propylene oxide).

17. The method of claim 1, wherein the thermally gelable organic binder is a cellulose-containing binder.

18. The method of claim 17, wherein the binder is selected from the group consisting of methyl cellulose and hydroxy methyl cellulose.

19. The method of claim 17, wherein the rapid setting compound is at a temperature in the range of 80° to 120° C.

20. The method of claim 1, further comprising the steps of removing the body from the rapid-setting compound, cutting the body into logs, and placing the cut logs in an oven to dry any excess rapid-setting liquid.

21. The method of claim 20, wherein the oven temperature is about 150° C.

22. The method of claim 21, wherein the logs are placed in the oven for a period of about 5 minutes.

23. A method of rapid-setting a porous body formed of a matrix containing methyl cellulose binder, the method comprising the steps of:
forming the matrix into a porous cellular body using a forming member,
contacting the body with a rapid-setting compound for a duration and at a temperature sufficient to stiffen the body, the rapid-setting compound being characterized by (a) having a strong water affinity to pull water out of the matrix, and (b) having appropriate molecular blocking configuration and/or large stearic hindrance to prevent the water from re-entering the matrix, and
removing any excess compound from the surface of the formed body.

24. The method of claim 20, wherein the body is contacted with the rapid-setting compound by dipping the body into a solution of the rapid-setting compound.

25. The method of claim 24, wherein the body is dipped in the solution of rapid-setting compound immediately as the formed body emerges from the forming member.

26. The method of claim 23, wherein the duration of contact between the body and the rapid-setting solution is in the range of 5 seconds to 10 minutes.

* * * * *

UNITED STATES PATENT AND TRADEMARK OFFICE
CERTIFICATE OF CORRECTION

PATENT NO.   : 5,258,205
DATED        : November 2, 1993
INVENTOR(S)  : Shy-Hsien Wu It is certified that error appears in the above-indentified patent and that said Letters Patent is hereby corrected as shown below:

Col. 4, line 7, "Embsorb" should be "Emsorb"

Signed and Sealed this

Twentieth Day of December, 1994

Attest:

BRUCE LEHMAN

Attesting Officer

Commissioner of Patents and Trademarks